(12) United States Patent
Perry et al.

(10) Patent No.: US 6,804,328 B1
(45) Date of Patent: Oct. 12, 2004

(54) INTELLIGENT LINE TESTING

(75) Inventors: Mark J. Perry, Cary, NC (US); Stephen C. Maglione, Raleigh, NC (US)

(73) Assignee: Nortel Networks Limited, St. Laurent (CA)

(*) Notice: Subject to any disclaimer, the term of this patent is extended or adjusted under 35 U.S.C. 154(b) by 284 days.

(21) Appl. No.: 09/631,181

(22) Filed: Aug. 2, 2000

(51) Int. Cl.[7] .......................... H04M 1/24; H04M 3/08; H04M 3/22
(52) U.S. Cl. .................... 379/22; 379/22.03; 379/29.01
(58) Field of Search .............................. 379/1.03, 1.04, 379/15.03, 9.02, 9.03–9.04, 10.02, 10.03, 21, 22.04, 27.01, 29.01, 29.05, 29.09, 32.04

(56) References Cited

U.S. PATENT DOCUMENTS

| | | | | |
|---|---|---|---|---|
| 4,611,320 A | * | 9/1986 | Southard | .................... 370/241 |
| 4,677,665 A | * | 6/1987 | Walker | |
| 4,939,765 A | * | 7/1990 | Benjamin et al. | |
| 5,521,958 A | * | 5/1996 | Selig et al. | |
| 6,061,429 A | * | 5/2000 | Clowez | |
| 6,209,108 B1 | * | 3/2001 | Pett et al. | |
| 6,295,339 B1 | * | 9/2001 | Jollota | |

* cited by examiner

*Primary Examiner*—Duc Nguyen
(74) *Attorney, Agent, or Firm*—Withrow & Terranova, PLLC

(57) ABSTRACT

The present invention provides for intelligent and efficient line testing by allowing a test control entity, such as an operational support system (OSS), to obtain information bearing on testing telephony lines. The information to be obtained relates to the structure or operation of the switching device. Preferably, the information obtained includes suggestions of which lines to test using test heads associated with the switching device. The suggestions may include a list of number that can be tested concurrently. Such suggestions may assist the OSS in providing instructions to the test heads to avoid line contention during testing, testing lines that are in use, or any number of scenarios potentially detrimental to efficient line testing. The information or suggestions may be obtained from an element manager or like entity having information about a particular switching device, or may be obtained directly from the switching device.

As such, the OSS will request line test instructions from the element manager or gateway, which will in turn provide line test instructions or suggestions back to the OSS. Based on the received information, the OSS will develop and provide line instructions to one or more test heads, which will carry out line tests at the switching device.

37 Claims, 5 Drawing Sheets

INTELLIGENT LINE TESTING

FIELD OF THE INVENTION

The present invention relates generally to line testing in a telephony system, and in particular to intelligent and automated line testing.

BACKGROUND OF THE INVENTION

Subscribers to the public switched telephone network (PSTN) are typically connected to a local switching system via groups of wires, commonly referred to as subscriber lines or subscriber loops. Telephone companies serving these subscribers must test these lines for operability and quality. Such testing may occur when known problems exist, or during preventative maintenance to monitor line quality or detect outages. Given the ever-increasing number of subscribers and lines necessary to service these subscribers, significant time and resources are dedicated to providing routine, automated line testing (ALT) for the subscriber lines.

Traditionally, automated line testing was conducted, by instructing a switch to sequentially test a range of numbers associated with a group of subscriber lines handled by the particular switch. As shown in FIG. 1, an operational support system (OSS) 10 is used to decide which subscriber lines to test. Testing occurs when the OSS 10 sends instructions to one of the test heads 12 to test a group of subscriber lines 14 handled by switch 16. As depicted, the subscriber lines 14 connect a line interface 18 with a subscriber 20. Exemplary line testing capable OSS's are Nortel Networks' AccessCare, Lucent Technologies' LMOS-MLT, and Teradyne's 4TEL.

The test heads 12 connect to a metallic test access cross-connect (MTACC) 22 over dedicated analog test trunks or pairs 24. The MTACC 22 may selectively connect any one of the analog test trunks directly to a line interface 18 associated with a subscriber line 14. Notably, the connection between the test head 12 and a selected subscriber line 14 is a direct, metallic connection. Preferably, the test heads 12 are fairly proximate to the switch 16, and the metallic connection between the test head 12 and the tested subscriber line 14 is as direct as possible.

To test any particular subscriber line 14, the OSS 10 sends an appropriate instruction to a test head 12. The test head will dial a number associated with the subscriber line 14 over the analog test pairs 24. The switch 16 recognizes that the number dialed over the analog test trunk is an instruction to facilitate a line test for the associated subscriber line 14. The switch 16 then effects a direct connection between the analog test pairs 24 and the line interface 18 associated with the subscriber line to be tested. At this point, the test head 12 has a direct, electrical and mechanical connection to the tested subscriber line 14 and tests the subscriber line 14 in traditional fashion. For automated line testing, the OSS 10 will instruct a test head 12 to test subscriber lines associated with a range of numbers. For example, the OSS 10 may instruct the test head 12 to test all subscriber lines 14 having a local exchange 555-XXXX. As such, all numbers within the exchange from 555-0000 through 555-9999 are tested.

Unfortunately, the OSS 10 has little or no information regarding the actual hardware configuration of the switch or how the various subscriber lines are arranged and placed within the numerous shelves, drawers, and cards used to store the line interfaces 18. Further, there are typically at least two test heads for any given switch 16, and the test heads 12 typically test their set of lines concurrently. Since there is no coordination between the OSS 10 and the allocation and assignment of subscriber lines 14 in the switch 16, there is often contention for common resources between the test heads 12 during automated line testing.

Typically, the test head 12 can only test one subscriber line at a time. Further, the switches 16 are normally configured such that the MTACC 22 can provide only one access path for any group of subscriber lines 14. For example, the MTACC 22 may only provide one connection for a shelf of line interfaces 18. Thus, only one test head 12 can gain access to the shelf at any given time. Since the OSS 10 doesn't know the assignment and allocation of the subscriber lines 14, it may request multiple test heads 12 to simultaneously test subscriber lines 14 that are on a common shelf. When this happens, there is a contention for access to the subscriber lines 14 by the test heads 12. As such, there is an interruption in the automated line testing for one of the test heads 12.

Another type of interference with line testing occurs when a subscriber 20 is using the particular subscriber line 14 slated for testing. The automated line testing is interrupted, because the OSS 10 isn't aware that the subscriber line 14 is being used. For smaller switches 16, contention between test heads 12 and use by subscribers 20 have not posed significant barriers to line testing. Larger switches and media gateways providing switching functions are more greatly affected by decreases in line testing efficiency. For example, the smaller switches may support only 640 lines or less. In contrast, larger gateways may support up to 16,000 lines or more and may be further grouped in clusters where millions of lines require testing on an automatic and periodic basis. As such, there is a need for an efficient and intelligent way to provide automated line testing in an efficient manner that avoids the contention or line use problems described above.

SUMMARY OF THE INVENTION

The present invention provides for intelligent and efficient line testing by allowing a test control entity, such as an operational support system (OSS), to obtain information bearing on testing telephony lines. The information to be obtained relates to the structure or operation of the switching device. Preferably, the information obtained includes suggestions of which lines to test using test heads associated with the switching device. The suggestions may include a list of numbers that can be tested concurrently. Such suggestions may assist the OSS in providing instructions to the test heads to avoid line contention during testing, testing lines that are in use, or any number of scenarios potentially detrimental to efficient line testing. The information or suggestions may be obtained from an element manager or like entity having information about a particular switching device, or may be obtained directly from the switching device.

As such, the OSS will request line test instructions from the element manager or gateway, which will in turn provide line test instructions or suggestions back to the OSS. Based on the received information, the OSS will develop and provide line instructions to one or more test heads, which will carry out line tests at the switching device.

Other aspects and features of the present invention will become apparent to those ordinarily skilled in the art upon reviewing the following description of the preferred embodiments of the invention in conjunction with the accompanying figures.

BRIEF DESCRIPTION OF THE DRAWING FIGURES

DETAILED DESCRIPTION OF THE PREFERRED EMBODIMENTS

The accompanying drawings incorporated in and forming a part of the specification illustrate several aspects of the present invention, and together with the detailed description of the preferred embodiments serve to explain the principles of the present invention.

Figure 2:
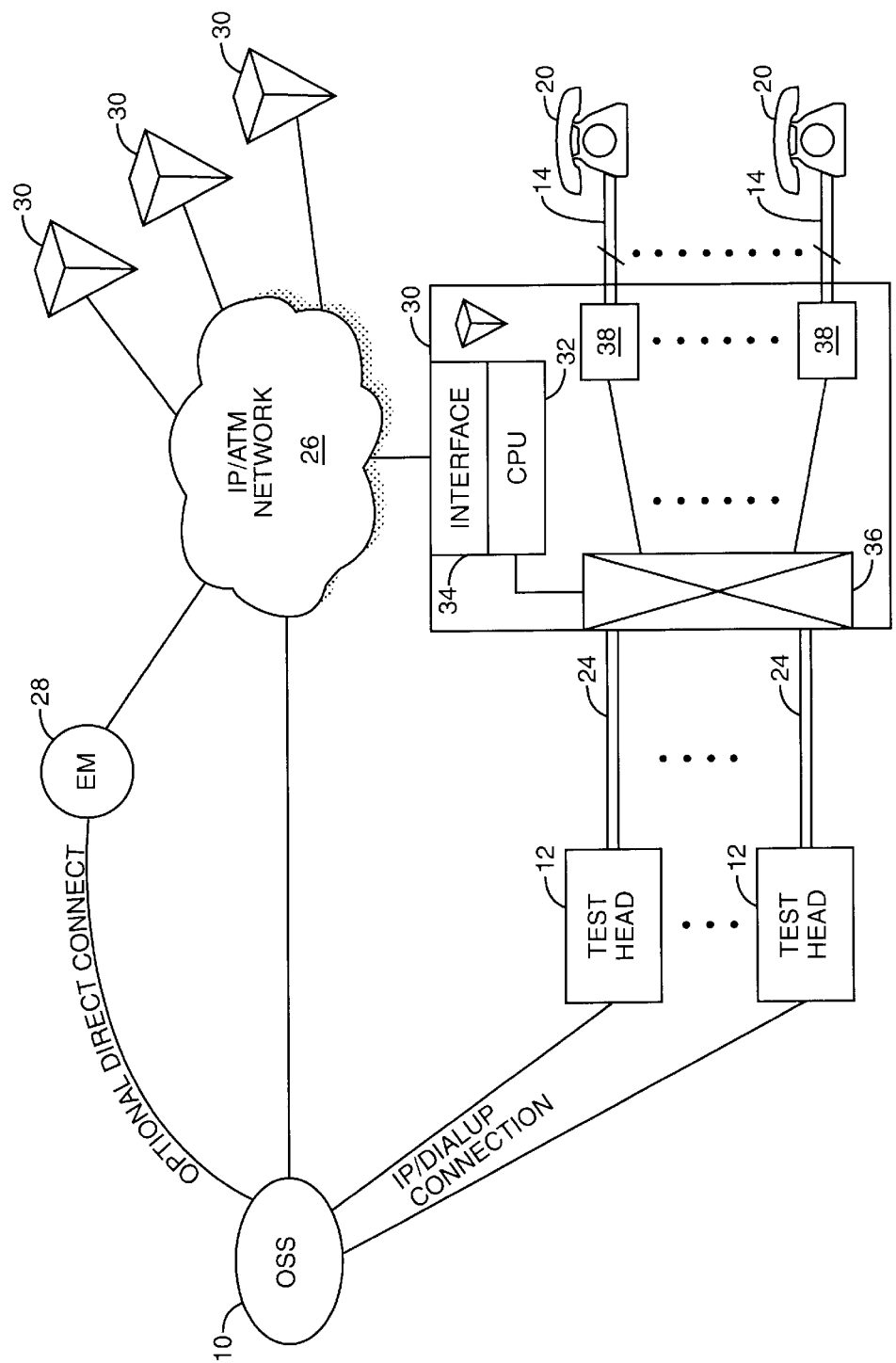
FIG. 2 is a block representation of elements used to facilitate line testing according to a preferred embodiment of the present invention.

With reference to FIG. 2, a preferred configuration for providing automated line testing is shown. Unlike the configurations of the prior art, the present invention provides for intelligent, automated line testing wherein those elements orchestrating line tests are capable of controlling the line tests in an efficient manner. Practice of the present invention may eliminate problems associated with contention between test heads 12, testing subscriber lines 14 that are in use, or the like.

An Internet Protocol (IP) or Asynchronous Transfer Mode (ATM) based network 26 is shown associated with an element manager 28 and numerous media gateways 30. The primary responsibility of the media gateways 30 is to allow media of various types, including voice, fax, video and data to be transported in a unified network. Typically, the media must be transportable both as packets in an IP-based network and as digital or analog streams in a circuit-switched network. In such applications, the media gateway provides bi-directional communications between a circuit-switched network and media-related elements associated with an IP network.

Figure 1:
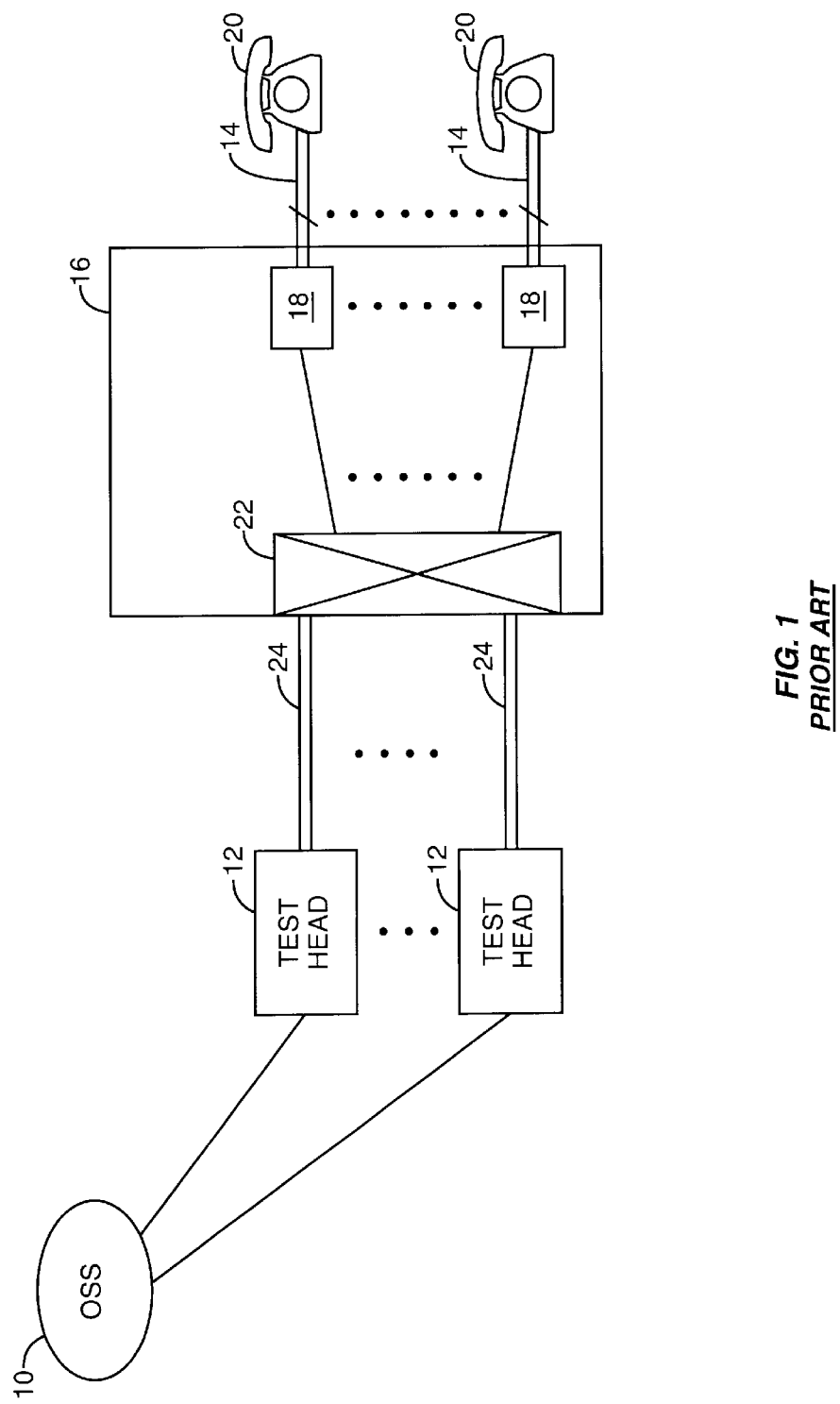
FIG. 1 is a block representation of elements used to facilitate line testing in a traditional manner.

Media gateways 30 generally interact with end users and telephony applications, or with other media gateways 30, to facilitate such applications. In essence, the media gateways 30 may be or may include the necessary switching circuitry and interface circuitry to provide traditional line interfaces for the public switched telephone network (PSTN). Further, the media gateways 30 may operate in the same fashion as the traditional switch 16, described above in association with FIG. 1.

A media gateway 30 preferably includes a central processing unit (CPU) 32 and a network interface 34 for interacting with any number of elements via a network 26. The media gateway 30 preferably includes a metallic test access cross-connect (MTACC) 36 and a number of line interfaces 38, which terminate subscriber lines 14. The MTACC 36 connects to test heads 12 via the analog test pairs 24. The OSS 10 interacts with the test heads 12 to facilitate testing of the various subscriber lines 14.

Figure 3:
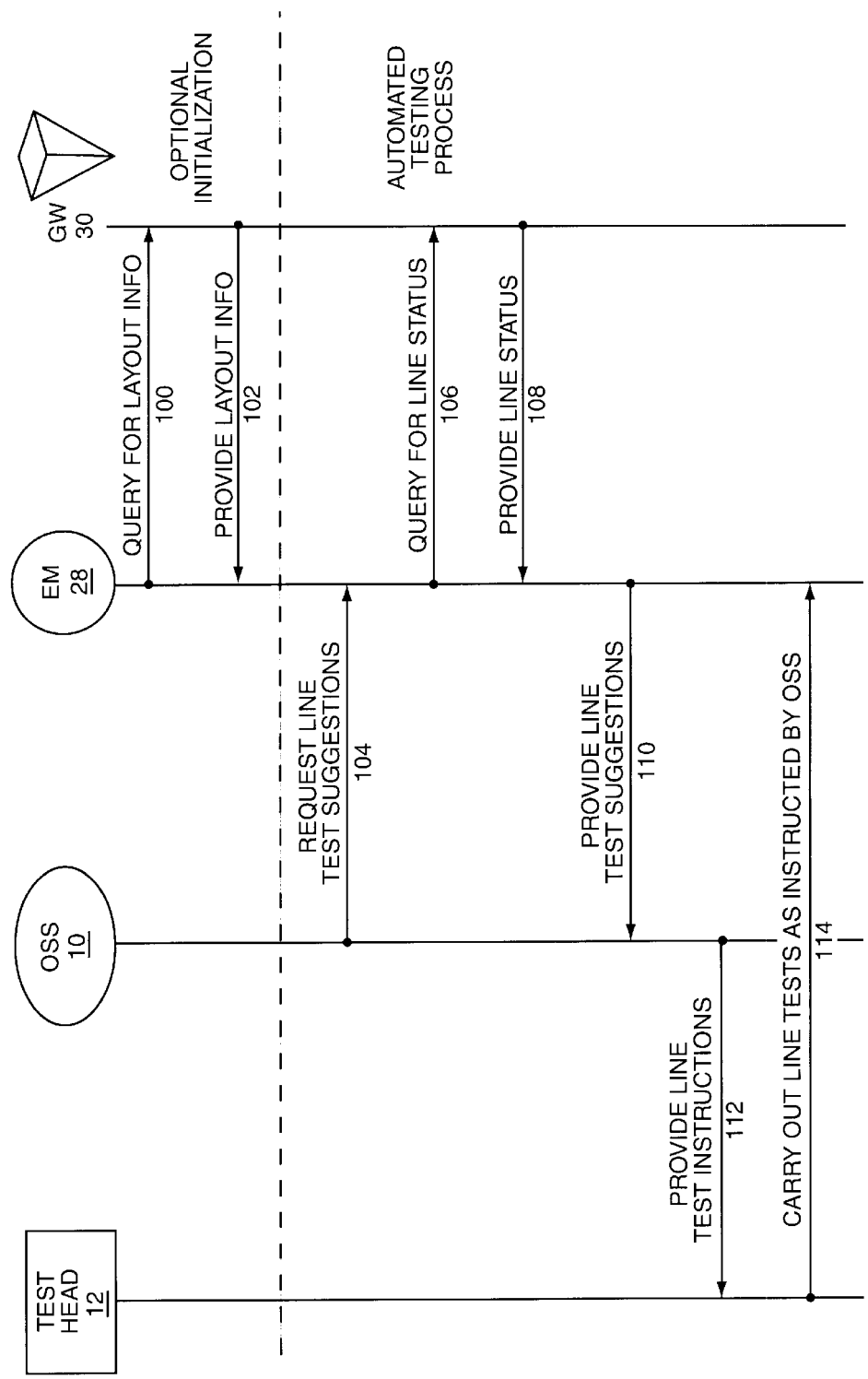
FIG. 3 is a diagram illustrating a first automated line testing process according to the present invention.

Unlike automated line testing of the prior art, the present invention allows the OSS 10 to make informed, automated line testing decisions based on the configuration of the media gateway 30, a status of subscriber lines 14 to be tested, or a combination thereof. The OSS 10 can receive this information directly or indirectly from the media gateway 30 containing the subscriber lines 14 to be tested. The preferred method is to obtain the information, in the form of line testing suggestions, indirectly through the element manager 28, which is tasked to determine gateway 30 configuration or subscriber line 14 status pertaining to line testing and to provide information to the OSS 10. An exemplary process is outlined in FIG. 3.

Optimally, the element manager 28 will periodically query the media gateway 30 for layout information (step 100). The layout information may pertain to how the MTACC 36 and the line interfaces are associated, and how their association bears on line testing. For example, the block or ranges of subscriber lines 14 may identify those lines in a group where only one line can be tested at a time, or at least, where the number of lines capable of being tested is greater than the number of test heads 12 used for testing. The initial layout information preferably provides sufficient information to allow multiple test heads 12 to efficiently test subscriber lines 14 associated with a particular media gateway 30 in parallel. To finalize the initialization, the media gateway 30 will provide the requested layout information in a suitable format for the element manager 28 (step 102). Notably, processing, organization and analysis of the layout information may be apportioned between the element manager 28 and the media gateway 30 to varying degrees.

To initiate line testing, the OSS 10 may request line testing suggestions for a particular media gateway 30 from the element manager 28 (step 104). In response, the element manager 28 is directed to respond with information facilitating automated line testing. The element manager 28 may already have this information, or may query the media gateway 30 for additional information, such as line status for the subscriber lines 14 that will be suggested (step 106). As such, the media gateway 30 will check the status of the selected lines 14 and provide a report of line status back to the element manager 28 (step 108).

The element manager 28 will provide line testing suggestions to the OSS 10 based on information pertaining to the particular media gateway 30 used for testing, and perhaps the specific subscriber lines 14 to be tested (step 110). The type of information obtained from the media gateway 30 may vary greatly. For example, all of the information may be obtained in real time and updated after the request from the OSS 10. In contrast, all the information may be obtained from an earlier initialization. Importantly, the information is obtained and used to provide suggestions or direction to the OSS 10 to facilitate efficient automated line testing.

The OSS 10 will process the information received from the element manager 28 as necessary to provide line test instructions to a selected test head 12 (step 112). In response, the test head 12 will carry out line test instructions as instructed by the OSS 10 at the selected media gateway 30 (step 114). The media gateway 30 will facilitate the automated line testing as directed. Notably, the OSS 10 will likely be instructing multiple test heads 12, and this process may be taking place concurrently, wherein multiple test heads 12 are carrying out multiple tests on a single media gateway 30. When the OSS 10 is processing the information from the element manager 28 and determining the line instructions to provide to the test head 12, all of the concurrent testing information, gateway configuration information, and subscriber line status information may be taken into account to enable the multiple test heads 12 to test the subscriber lines 14 in an efficient manner. Importantly, the OSS 10 will orchestrate tests that avoid testing contention. Further optimization is provided when the OSS 10 takes into consideration the use of subscriber lines 14 and avoids attempts at testing a subscriber line 14 involved in a call.

Figure 4:
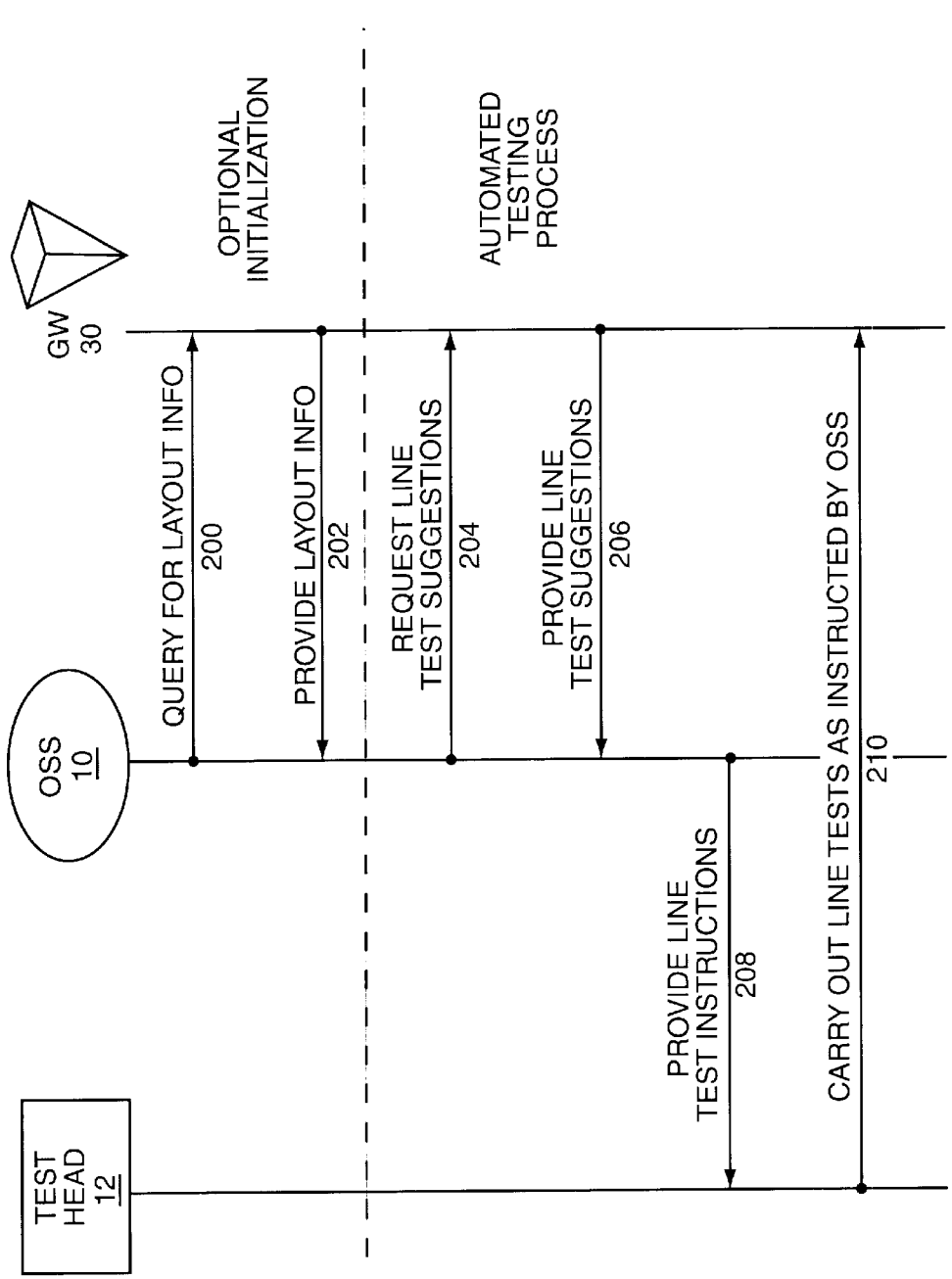
FIG. 4 is a diagram illustrating a second automated line testing process according to the present invention.

As noted, the OSS 10 may directly communicate with the media gateway 30 to facilitate the same, efficient automated line testing described above. An exemplary process is shown in FIG. 4. As noted above, the OSS 10 may query for layout information pertaining to the media gateway's 30 configuration and assignment of subscriber lines 14 (step 200). The query is made directly to the media gateway 30. The media gateway 30 will respond by providing a response to the query (step 202) to complete the optional initialization. During testing, the OSS 10 will again directly communicate with the media gateway 30 to request line testing suggestions (step 204). The media gateway 30 will respond by providing line test suggestions (step 206) to the OSS 10. The OSS 10 will then process the line test suggestions, determine line test instructions, and provide those test instructions to the test head 12 (step 208). The test head 12 will then carry out the line test as instructed by the OSS 10 as described above (step 210).

The type of information and amount of processing of such information may vary for each OSS 10 and media gateway 30. Certain configurations may require the OSS 10 to provide significant processing of raw data provided by the gateway 30. In contrast, the gateway may operate to provide most of the processing and send detailed information and suggestions to the OSS 10. In the latter case, the OSS 10 may require very little processing to provide appropriate line test instructions to the various test heads 12.

Of further note, the element manager 28 is a preferred device for handling the interface between the OSS 10 and the media gateway 30. Preferably, the OSS 10 will not realize that it is communicating with the element manager 28 rather than the selected media gateway 30. Although this is preferred, the OSS 10 may be specifically configured to knowingly communicate with the element manager 28 in order to obtain information for the media gateway 30. Further, the functionality of the element manager 28 may be provided in any number of third party devices or integrated with one or more known network elements without departing from the principles of the present invention.

Figure 6:
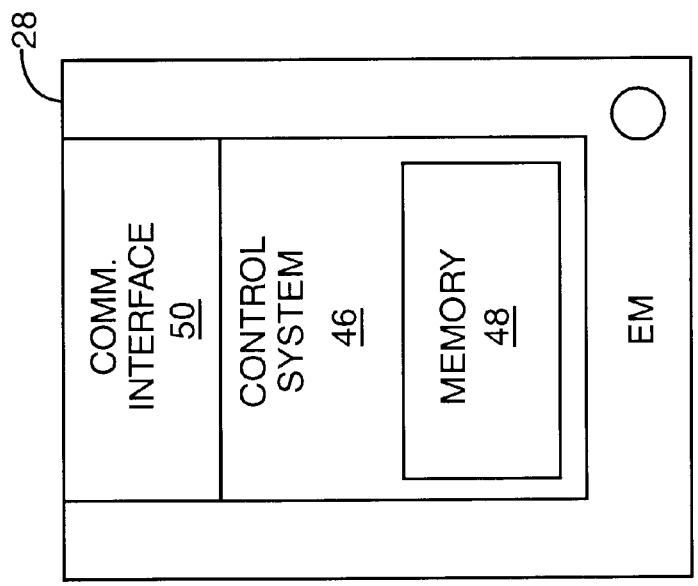
FIG. 6 is a block representation of an element manager according to the present invention.
Figure 5:
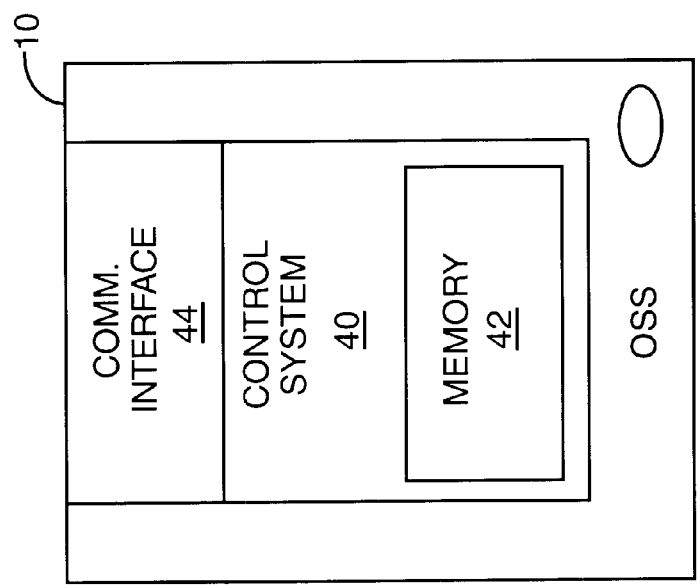
FIG. 5 is a block representation of the OSS according to the present invention.

As shown in FIG. 5, the OSS 10 is of typical configuration and includes a control system 40 with requisite memory 42 capable of storing software for operation. The control system 40 is associated with a communication interface 44 to facilitate communications with a network or communications with the test heads 12 or element manager 28 directly. Similarly, as shown in FIG. 6, the element manager 28 includes a control system 46 with the requisite memory 48 and software necessary for operation. The element manager 28 also includes a communication interface 50 capable of interfacing with a network or providing direct communications with the OSS 10. Those skilled in the art will recognize the various configurations of the communication interface for the OSS 10 as well as that for the element manager 28.

Notably, the OSS 10 may communicate with the element manager 28 through the network 26, a second network, or by a direct connection. Similarly, the OSS 10 may communicate with any one or more of the test heads 12 over a network 26, in a packet switched or circuit switched fashion, or by direct connection, such as a dial-up connection. Those of ordinary skill in the art will also recognize that the functionality of the OSS 10 may be provided in a variety of systems or isolated in a dedicated device.

The foregoing description of the preferred embodiments of the invention has been presented for the purposes of illustration and description. It is not intended to be exhaustive or to limit to the precise form disclosed. The embodiments were chosen and described in order to best illustrate the principles of the invention and its practical application to thereby enable one of ordinary skill in the art to best use the invention in various embodiments and with various modifications as are suited to the particular use contemplated. It is intended that the scope of the invention be defined by the following claims.

What is claimed is:

1. A method of facilitating telephony line testing comprising:
    a) requesting information bearing on testing telephony lines of a switching device including information that identifies groups of lines to be tested in parallel while avoiding contention;
    b) receiving the information bearing on testing telephony lines;
    c) generating testing instructions for the telephony lines based on the information bearing on testing telephony lines such that groups of lines will be tested in parallel while avoiding contention, wherein the information bearing on testing telephony includes information pertaining to a layout of testing and line interface hardware, and wherein the information pertaining to a layout of testing and line interface hardware comprises information concerning a layout of elements selected from the group consisting of: drawers, shelves, cards, and metallic test access cross-connects; and
    d) providing the testing instructions for testing the telephony lines of the switching device to a testing device configured to test the telephony lines,
    wherein the testing device interacts with the switching device to conduct lines tests according to the testing instructions.

2. The method of claim 1 wherein the generating step further comprises developing instructions for a plurality of testing devices such that the testing devices conduct line tests of the telephony lines of the switching device without contention.

3. The method of claim 1 wherein the generating step further comprises developing instructions for the testing device such that the testing device conducts line tests without attempting to test telephony lines that are in use.

4. The method of claim 1 wherein the generating step further comprises developing instructions for a plurality of testing devices such that the testing devices conduct line tests of the telephony lines of the switching device without contention and avoid testing lines that are in use, and the providing step comprises providing the testing instructions to the plurality of testing devices.

5. The method of claim 1 wherein the information bearing on testing telephony lines is requested and received from a managing element.

6. The method of claim 1 wherein the information bearing on testing telephony lines is requested and received from the switching device.

7. The method of claim 1 wherein the information bearing on testing telephony lines further includes information pertaining to a layout of other testing and line interface hardware for the switching device.

8. The method of claim 1 wherein the information bearing on testing telephony lines identifies an order in which to test certain of the telephony lines in the switching device.

9. The method of claim 1 wherein the information bearing on testing telephony lines includes suggestions for testing at least certain of the telephony lines of the switching device.

10. A method of facilitating telephony line testing comprising:
obtaining information bearing on testing telephony lines for a switching device including information that identifies a layout of hardware in the switching device including placement of cards, shelves, and drawers;
receiving a request for the information bearing on testing telephony lines of a switching device from a test control entity;
generating testing instructions for the telephony lines based don the information bearing on testing telephony lines; and
sending the information bearing on testing telephony lines to the test control entity,
wherein the test control entity instructs a testing device to conduct lines tests at the switching device according to the testing instructions.

11. The method of claim 10 wherein the information bearing on testing telephony lines is obtained from the switching device.

12. The method of claim 10 further including generating suggestions for testing at least certain of the telephony lines for the switching device and providing the suggestions for testing the telephony lines in the information bearing on testing telephony lines.

13. The method of claim 12 wherein the generating step comprises developing suggestions for testing at least certain of the telephony lines of the switching device with a plurality of testing devices such that the testing devices conduct line tests of the telephony lines of the switching device without contention.

14. The method of claim 12 wherein the generating step comprises developing suggestions for testing telephony lines such that line tests avoid testing telephony lines that are in use.

15. The method of claim 12 wherein the generating step comprises developing suggestions for testing a plurality of testing devices such that the testing devices conduct line tests of the telephony lines of the switching device without contention and avoid testing telephony lines that are in use.

16. The method of claim 10 wherein the test control entity is an operational support system.

17. A method of facilitating telephony line testing comprising:
providing information bearing on testing telephony lines based on a configuration for testing and switching wherein the information includes information about groups of lines to be tested in parallel, wherein the information bearing on testing telephony lines further includes information pertaining to a layout of testing and line interface hardware comprises information concerning a layout of elements selected from the group consisting of: drawers, shelves, cards, and metallic test access cross-connects;
receiving a request for the information bearing on testing telephony lines of a switching device from a test control entity;
generating testing instructions for the telephony lines based on the information bearing on testing telephony lines; and
sending the information bearing on testing telephony lines to the test control entity,
wherein the test control entity instructs a testing device to conduct lines tests at the switching device according to the testing instructions.

18. The method of claim 17 further including generating suggestions for testing at least certain of the telephony lines and providing the suggestions for testing the telephony lines in the information bearing on testing telephony lines.

19. The method of claim 18 wherein the generating step comprises developing suggestions for testing at least certain of the telephony lines of the switching device with a plurality of testing devices such that the testing devices conduct line tests of the telephony lines of the switching device without contention.

20. The method of claim 18 wherein the generating step comprises developing suggestions for testing telephony lines such that line tests avoid testing telephony lines that are in use.

21. The method of claim 18 wherein the generating step comprises developing suggestions for testing a plurality of testing devices such that the testing devices conduct line tests of the telephony lines of the switching device without contention and avoid testing telephony lines that are in use.

22. A computer readable media comprising software adapted to instruct a computer to:
a) request information bearing on testing telephony lines of a switching device, wherein the information includes information pertaining to a layout of testing and line interface hardware comprises information concerning a layout of elements selected from the group consisting of: drawers, shelves, cards, and metallic test access cross-connects;
b) receive the information bearing on testing telephony lines including information identifying groups of lines to be tested in parallel while avoiding contention;
c) generate testing instructions for the telephony lines based on the information bearing on testing telephony lines; and
d) provide the testing instructions for testing the telephony lines of the switching device to a testing device configured to test the telephony lines,
wherein the testing device interacts with the switching device to conduct lines tests according to the testing instructions.

23. The computer readable media of claim 22 wherein the software comprises further instructions to develop instructions for a plurality of testing devices such that the testing devices conduct line tests of the telephony lines of the switching device.

24. The computer readable media of claim 22 wherein the software comprises further instructions to provide instruction to the testing device such that line tests are conducted without attempting to test telephony lines that are in use.

25. The computer readable media of claim 22 wherein the software comprises further instructions to develop instructions for a plurality of testing devices such that the testing devices conduct line tests of the telephony lines of the switching device without contention and avoid attempting to test telephony lines that are in use.

26. The computer readable media of claim 22 wherein the software comprises further instructions to develop suggestions for testing at least certain of the telephony lines of the switching device with a plurality of testing devices such that the testing devices conduct line tests of the telephony lines of the switching device without contention.

27. A computer readable media comprising software adapted to instruct a computer to:
obtain information bearing on testing telephony lines for a switching device;
receive a request for the information bearing on testing telephony lines of a switching device from a test control entity;

generate testing instructions for the telephony lines based on the information bearing on testing telephony lines; and send the information bearing on testing telephony lines to the test control entity including information relating to a layout of shelves, drawers, and cards within the switching device, wherein the test control entity instructs a testing device to conduct lines tests at the switching device according to the testing instructions.

28. The computer readable media of claim 27 wherein the software comprises further instructions to generate suggestions for testing at least certain of the telephony lines for the switching device and to provide the suggestions for testing the telephony lines in the information bearing on testing telephony lines.

29. The computer readable media of claim 27 wherein the software comprises further instructions to develop suggestions for testing at least certain of the telephony lines of the switching device with a plurality of testing devices such that the testing devices conduct line tests of the telephony lines of the switching device without contention.

30. The computer readable media of claim 27 wherein the software comprises further instructions to develop suggestions for testing such that line tests avoid testing telephony lines that are in use.

31. The computer readable media of claim 27 wherein the software comprises further instructions to develop suggestions for testing a plurality of testing devices such that the testing devices may conduct line tests of the telephony lines of the switching device without contention and avoid testing telephony lines that are in use.

32. A system for facilitating telephony line testing comprising:

a) means for requesting information bearing on testing telephony lines of a switching device including information identifying groups of lines to be tested in parallel, wherein the information includes information pertaining to a layout of testing and line interface hardware comprises information concerning a layout of elements selected from the group consisting of: drawers, shelves, cards, and metallic test access cross-connects;

b) means for receiving the information bearing on testing telephony lines;

c) means for generating testing instructions for the telephony lines based on the information bearing on testing telephony lines; and d) means for providing the testing instructions for testing the telephony lines of the switching device to a testing device configured to test the telephony lines, wherein the testing device interacts with the switching device to conduct lines tests according to the testing instructions.

33. A computer readable medium comprising software adapted to instruct a computer to:

provide information bearing on testing telephony lines based on a configuration for testing and switching, wherein the information bearing on testing telephony lines comprises at least in part information concerning a layout of elements selected from the group consisting of: drawers, shelves, cards, and metallic test access card connects;

receive a request for the information bearing on testing telephony lines of a switching device from a test control entity, and send the information bearing on testing telephony lines to the test control entity, wherein the test control entity may instruct a testing device to conduct lines tests at the switching device according to the testing instructions.

34. The computer readable medium of claim 33 wherein the software comprises further instructions to generate suggestions for testing at least certain of the telephony lines for the switching device and to provide the suggestions for testing the telephony lines in the information bearing on testing telephony lines.

35. The computer readable medium of claim 33 wherein the software comprises further instructions to develop suggestions for testing at least certain of the telephony lines of the switching device with a plurality of testing deices such that the testing devices may conduct line tests of the telephony lines of the switching device without contention.

36. The computer readable medium of claim 33 wherein the software comprises further instructions to develop suggestions for testing such that line tests avoid testing telephony lines that are in use.

37. The computer readable medium of claim 33 wherein the software comprises further instructions to develop suggestions for resting a plurality of testing devices such that the testing devices may conduct lines tests of the telephony lines of the switching device without contention and avoid testing telephony lines that are in use.

* * * * *